UNITED STATES PATENT OFFICE.

REINHOLD GRÜTER, OF CHARLOTTENBURG, AND HEINRICH POHL, OF BIEBRICH, GERMANY, ASSIGNORS TO CHEMISCHE WERKE VORM. DR. HEINRICH BYK, OF LEHNITZ-NORDBAHN, GERMANY.

PROCESS FOR THE MANUFACTURE OF ESTERS OF OXY FATTY ACIDS.

1,160,595.  Specification of Letters Patent.  Patented Nov. 16, 1915.

No Drawing. Application filed May 29, 1913. Serial No. 770,628.

*To all whom it may concern:*

Be it known that we, REINHOLD GRÜTER and HEINRICH POHL, both citizens of the German Empire, residing at Charlottenburg, Germany, and Biebrich, Germany, respectively, have invented certain new and useful Improvements in Processes for the Manufacture of Esters of Oxy Fatty Acids, of which the following is a specification.

As is known the esterification of oxy-acids of the fatty series is attended by difficulties. Schreiner, for instance states (*Annalen* 197,12) that on heating lactic acid with absolute alcohol at 150° C., in a closed tube, no formation of ester takes place. The process of Wislicenus, which consists in heating lactic acid in a retort at 170°–180° C., and leading a rapid stream of alcohol through, is tedious, requires a large excess of alcohol, and necessitates the high temperature mentioned; moreover the yield is poor. This drawback also attaches to the process of Friedel and Wurtz according to which lactic acid dehydrated (anhydridized) at 140–160° C., is heated with alcohol at 170° C. Even the production of glycolic acid ester from polyglycolid and absolute alcohol is performed at a high temperature (200° C.) under pressure.

We have now found that it is possible to produce the esters of the oxy-acids at low temperatures and with practically quantitative yields, if a carrier is added to the mixture of dehydrated (anhydridized) oxy-acid and alcohol. As such carriers we mention acid substances and compounds of heavy metals, such as are both usually employed for the esterification of acids with alcohol. Of the compounds of heavy metals, the aluminium compounds, such for instance as aluminium sulfate, and the compounds of titanic acid, for instance titanic anhydrid, are for example important. The amount of the addition needs only to be small as the action concerned is a catalytic one. If for example dehydrated (anhydridized) lactic acid obtained by raising lactic acid gradually to temperatures of 170–180° C., while passing a current of air through and which has thus become almost entirely anhydridized and which, for the purposes of this specification, may be termed completely anhydridized, is heated with alcohol containing for example 2 per cent. of gaseous hydrochloric acid in solution, using the reflux condenser, the highly molecular lactic anhydrid, which is insoluble in alcohol, goes into solution and the lactic acid ester is formed. Similarly polyglycolid, which is for itself insoluble, goes into solution with formation of glycolic acid ester after some hours boiling with alcohol to which one of the said catalytic agents has been added, using the reflex condenser. The higher the temperature at which the alcohol boils, the more rapid is the esterification.

Not only can ordinary alcohols such as methyl and ethyl alcohol, be used for the reaction of the present invention, but the derived alcohols, such for example as amyl alcohol, polyvalent alcohols and likewise the phenols, substituted phenols and alcohols, are converted into the esters of the oxy-acids according to the method of the present invention and the mode of operation is the same if they are heated with the highly molecular inner esters of the oxy-acids with addition of a catalytic agent. In these cases also the reaction takes place at approximately the same low temperatures.

When the reaction is completed, the resulting ester is distilled over and in this way purified. Even when crude, dark-colored anhydrid is employed, a water-bright ester distils. The alcohol may be used in excess in the reaction, and after the reaction is complete the excess can be collected as first runnings of the distillation. Should the reaction not be carried right to the end, the non-esterified portion of the anhydrid of the acid remains. This does not need to be isolated but can be esterified in exactly the same way as the starting product by further boiling with alcohol and an addition of one of the carriers or catalytic agents.

It has further been found that the production of the oxy-acid esters can be simplified and facilitated if one starts not from the highly molecular anhydridized oxy-acids as hitherto, but from those products which are obtained by depolymerizing the same. Thus for example lactid and other polymers are obtained by distilling anhydridized highly molecular lactic acid and from poly-glycolid diglycolid is obtained.

It has been found that if these anhydrids of the oxy-acids, obtained by distillation are treated with alcohol, the esterification likewise takes place at low temperature. In this case also the esterification occurs even on boiling with the reflux condenser. The reaction however takes place more rapidly and completely if one of the above named catalytic substances is added. The method of working is otherwise the same as when employing the highly molecular anhydrid compounds, but the reaction is complete in about half the time and sometimes still more quickly.

When alcohol is used in theoretical quantity or only in slight excess, the end of the reaction can be recognized by the fact that after some boiling the amount of alcohol flowing back becomes smaller and smaller.

The practical possibility of the present reaction was not to be foreseen, as it is well known that the oxy-acid anhydrids employed are not ordinary anhydrids of acids but are inner esters, and moreover it might be considered that the catalytic agent would have a decomposing action as it is known from the specification of German Patent 171835 that sulfuric acid and even hydrochloric acid are detrimental in the esterification of lactic acid with alcohol.

We claim:

1. Process for the production of esters of oxy fatty acids, consisting in conducting the esterification of the oxy-fatty acids with alcohols in such manner that the latter are caused to act on the substantially completely anhydridized oxy fatty acids in the presence of catalytic agents.

2. Process for the production of esters of oxy fatty acids, consisting in conducting the esterification of the oxy-fatty acids with substances composed of an organic radicle united to an hydroxyl group in such manner that the latter substances are caused to act on the substantially completely anhydridized oxy fatty acids in the presence of catalytic agents.

3. Process for the production of esters of oxy fatty acids, consisting in conducting the esterification of the oxy-fatty acids with alcohols in such manner that the latter are caused to act on the depolymerized substantially completely anhydridized oxy fatty acids in the presence of catalytic agents.

4. Process for the production of esters of oxy fatty acids, consisting in conducting the esterification of the oxy-fatty acids with substances composed of an organic radicle united to an hydroxyl group in such manner that the latter substances are caused to act on the depolymerized substantially completely anhydridized oxy fatty acids in the presence of catalytic agents.

5. Process for the production of esters of oxy fatty acids, consisting in conducting the esterification of the oxy-fatty acids with alcohols in such manner that the latter are caused to act on the depolymerized substantially completely anhydridized oxy fatty acids.

6. Process for the production of esters of oxy fatty acids, consisting in conducting the esterification of the oxy-fatty acids with substances composed of an organic radicle united to an hydroxyl group in such manner that the latter substances are caused to act on the depolymerized substantially completely anhydridized oxy fatty acids.

In testimony whereof we affix our signatures in presence of two witnesses.

REINHOLD GRÜTER.
HEINRICH POHL.

Witnesses as to Reinhold Grüter:
  HENRY HASPER,
  WOLDEMAR HAUPT.

Witnesses as to Heinrich Pohl:
  MARIA MENKE,
  MORITZ WETZEL.